3,471,467
DISPERSIBLE MONOAZO DYES
Hans E. Wegmuller and Werner Bossard, Riehen, Switzerland, assignors to J. R. Geigy A.G., Basel, Switzerland
No Drawing. Original application Feb. 15, 1963, Ser. No. 343,202, now Patent No. 3,320,232, dated May 16, 1967. Divided and this application Jan. 9, 1967, Ser. No. 623,157
Claims priority, application Switzerland, Feb. 15, 1963, 1,904/63, 1,905/63
Int. Cl. C09b 29/38, 62/08
U.S. Cl. 260—153    4 Claims

ABSTRACT OF THE DISCLOSURE

Monoazo dyes containing 1-triazinyl-3-methyl-5-iminopyrazole coupling components which dyes are free from groups which dissociate in water and from sulfuric acid amide, carbonic acid amide and aryloxysulfonyl radicals and are reddish yellow to orange scarlet dyes of good fastness properties and are suitable for the dyeing of hyrophobic organic synthetic textile fibers.

---

The present application is a division of copending application, Ser. No. 343,202, filed Feb. 7, 1964, and now Patent No. 3,320,232.

The invention concerns new dispersion dyestuffs which do not contain metal and are difficulty soluble in water, processes for their production, processes for the dyeing of hydrophobic organic fibers using the new dyestuffs and, as industrial product, the material dyed with the aid of these dyestuffs.

In the scale of shades hitherto available for the disperse dyeing of polyester fibers, there has been lacking a yellow to orange shade which would combine in dyeings on the said fibers, optimal wet fastnesses, fastness to light and to sublimation, with a satisfactory drawing power on the said fibers, and good compatibility with blue shades due to an especially good migratory power in these fibers.

Known yellow polyester dyes show sufficient drawing power and fastness to sublimation, but were found wanting in one or several of the other above-named properties. Disperse azo dyes containing a 1-phenyl-3-methyl-5-pyrazolone coupling component, which would be particularly desirable for economic reasons, fail even in the two last-named properties. Sulfonic acid aryl ester- and sulfamyl-substituted derivatives of the last-mentioned dyestuff class fail particularly in compatibility with blue shades. The resulting green shades are otfen uneven and skittery.

It is, therefore, a principal object of the present invention to provide disperse azo dyes of similar accessibility as the forementioned azo dyes containing 1-phenyl-3-methyl-5-pyrazolone coupling components, which, however, combine most or all of the above listed desirable properties.

This object and others which will become apparent as the description of this invention proceeds, are attained by the azo dyestuffs according to the present invention.

The terms "alkyl," "alkoxy" and "alkanoyl" as used in this specification and in the appended claims to define substituentfs, means those having from 1 to 4 carbon atoms, unless expressly stated otherwise.

These dyestuffs are reddish yellow to orange scarlet metal-free dyestuffs free from groups dissociating acid in water and from sulfonic acid amide, carbonic acid amide and aryloxy-sulfonyl radicals, which are dyestuffs of the formula $$A-N=N-CH-C-CH_3$$
$$HN=C\quad N$$

(IIIA)

wherein

A represents an azo dyestuff diazo component radical selected from the class consisting of benzene diazo components, thiazole diazo components, or benzothiazole diazo component radicals.

$R_5$ representsa
—$NH_2$, N-alkyl-amino wherein alkyl is of 1 to 6 carbon atoms,
N-hydroxyalkyl-amino wherein alkyl is of from 2 to 6 carbon atoms.
N-lower alkoxy-alklamino wherein alkyl is of from 2 to 4 carbon atoms, β-cyano-ethyl amino, N,N-di-alkyl-amino.
N,N-bis-(hydroxy-alkyl)-amino wherein each alkyl is of from 2 to 3 carbon atoms.
N-alkyl-N-hydroxy-alkyl - amino wherein "hydroxy alkyl" is of from 2 to 3 carbon atoms.
N-alkyl-N-alkoxy-alkyl-amino wherein the last mentioned alkyl is of from 2 to 3 carbon atoms.
Piperidinyl-(1), morpholinyl-(1), alkoxy of from 1 to 6 carbon atoms, chloro- and bromo-alkoxy, alkoxy-alkoxy,, cyano-alkoxy the last four members having 2 to 4 carbon atoms in the alkoxy moiety linked to the triazinyl nucleus, or finally alkylthio of from 1 to 6 carbon atoms, and $R_6$ represents a radical as defined above under $R_5$ or hydroxy, mercapto, phenylamino, chlorophenylamino, bromophenylamino, lower alkyl phenylamino, lower alkoxy-phenylamino, cyclohexylamino, benzylamino, chlorobenzylamino, lower alkyl-benzylamino, or N-lower alkyl-N-phenylamino, which dyestuffs are yellowish to reddish orange. They are distinguished from correspondingly substituted 1-phenyl-3-methyl-5-amino-pyrazole dyestuffs by superior fastness to sublimation.

Particularly valuable dyestuffs according to the invention are obtained with diazonium compounds of the benzene series which contain at least one electrophilic substituent in o- or p-position to the diazo group, in particular with o- or p-nitro-phenyl diazonium compounds having two negative substituents, especially those of the last-mentioned compounds which also contain a further cyano, methylsulfonyl or ethyl-sulfonyl group, or chlorine or bromine atoms.

Preferred dyestuffs are derived in particular from 1-amino - 4 - ethylsulfonyl - 2 - nitrobenzene, 1 - amino-4 - methylsulfonyl - 2 - nitrobenzene, 1 - amino - 2-chloro - 4 - nitrobenzene and 1 - amino - 2 - cyano - 4-nitrobenzene, which are first diazotized and then coupled with a coupling component falling under Formula IIIA.

Because of their easy accessibility and good affinity to polyester fibers, particularly valuable compounds falling under Formula IIIA are those in which $R_5$ and $R_6$ are identical and represent alkylamino, hydroxyalkylamino, alkoxyalkylamino, dialkylamino, N - alkyl - N - hydroxyalkylamino or alkoxy groups.

Particularly valuable dyestuffs are those of Formula IIIA which contain coupling components in which of $R_5$ and $R_6$ each represents a monoalkylamino group, which may be substituted by alkoxy or hydroxy, a dialkylamino group, a N - alkyl - N - hydroxyalkylamino group or a lower alkoxy group, the various groups having the numbers of carbon atoms as defined hereinbefore in connection with Formula IIIA.

Orange dyestuffs according to the invention which possess very good properties as described above, and are also distinguished especially by excellent light-fastness are those of the formula

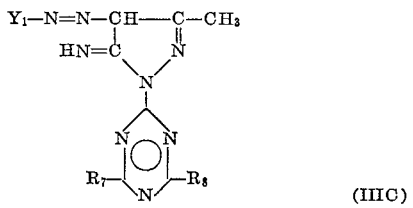

(IIIC)

wherein $Y_1$ represents one of the radicals of the formula

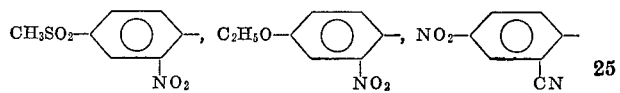

and

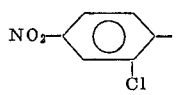

and each of $R_7$ and $R_8$ represents independently of the other, N-alkylamino of from 1 to 6 carbon atoms, N-lower alkoxy-alkylamino wherein "alkyl" is of from 2 to 4 carbon atoms, hydroxy-alkylamino of from 1 to 6 carbon atoms, dialkylamino wherein each "alkyl" is of from 1 to 6 carbon atoms, N-alkyl-N-hydroxy-alkylamino wherein "hydroxy-alkyl" is of from 2 to 3 carbon atoms, or an alkoxy radical.

The dyestuffs according to the invention are brought into finely distributed form by milling with dispersing agents. Suitable dispersing agents are, e.g., anionic dispersing agents such as alkylaryl sulfonates, condensation products of formaldehyde and naphthalene sulfonic acids, lignin sulfonates, or non-ionogenic dispersing agents such as fatty alcohol polyglycol ethers.

Dyestuffs according to the invention are suitable for the dyeing of hydrophobic organic synthetic textile fibers from aqueous dispersion, e.g., for the dyeing of cellulose di- and tri-acetate, particularly however, for the dyeing of high molecular esters of aromatic polycarboxylic acids with polyfunctional alcohols, e.g., of polyethylene glycol terephthalates such as Terylene, Tergal, Trevira, Diolen, as well as of other polymers such as Kodel.

The dyestuffs can also be used, however, for the dyeing of synthetic polyamide fibers such as nylon or "Perlon."

Polyester fibers are dyed with aqueous dispersions of the dyestuffs according to the invention preferably at temperatures of over 100° C. under pressure. The dyeing can also be performed, however, at the boiling point of the water in the presence of carriers such as phenylphenol, polychlorobenzene compounds or other similar auxiliaries, or by the foulard process (pad-dyeing) followed by thermofixing at 180–210° C.

Dyestuffs according to this invention are distinguished by their good affinity to hydrophobic polyester fibers, in particular to polyglycol terephthalates and, depending on their composition, they produce on these fibers reddish yellow, orange to orange-scarlet dyeings of good color strength which have very good fastness to washing, milling, sublimation, light, rubbing, perspiration, solvents, cross-dyeing, decatising and gas fading. In addition, vegetable fibers, in particular cotton, are very well reserved by the dyestuffs according to the invention. Also level dyeings are obtained with the usual market carriers.

The dyestuffs of Formula IIIA as well as other structurally similar dyestuffs which fall under the general formula

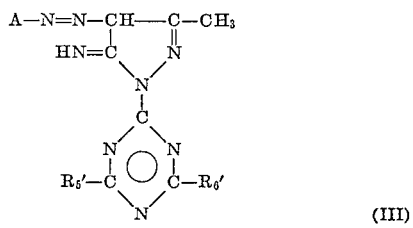

(III)

wherein A represents the aromatic radical of the carbocyclic or heterocyclic diazonium compound, and $R_5'$ and $R_6'$ each represents an inert monovalent substituent, are obtained by coupling an aromatic diazonium compound of the carbocyclic or heterocyclic series with a compound of the formula

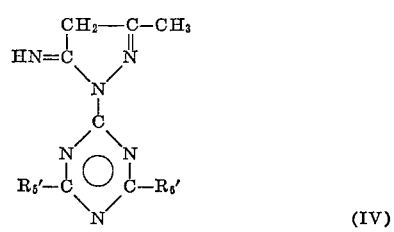

(IV)

wherein $R_5'$ and $R_6'$ have the aforesaid meaning, and the components are so chosen that the dyestuff does not contain any water-solubilizing groups which dissociate acid in water. As carbocyclic diazonium compounds, preferably those of the benzene series or also those of the naphthalene series are used. Heterocyclic diazonium compounds have mainly 5 or also 6 membered rings, particularly rings containing nitrogen, which may be fused with carbocyclic rings. Preferred heterocycles contain one nitrogen atom in the ring in a position adjacent to the azo bond and are of, in particular, the thiazole, triazole, tetrazole, thiadiazole, oxadiazole, pyrazole, pyridine, benzthiazole or indazole series.

The ring A of the aromatic diazonium compounds of the carbocylic series usable according to the invention can be unsubstituted or they can be mono- or poly-substituted by identical or different substituents. Examples of substituents are among others: hydrocarbon radicals such as normal or branched chain alkyl groups, preferably those having up to 4 carbon atoms, cycloalkyl groups, particularly those having 6 to 8 carbon atoms, unsubstituted phenyl or unsubstituted phenylalkyl groups and those substituted by alkyl or halogen; also ether groups, mainly low alkoxy and low hydroxyalkoxy groups, then unsubstituted phenoxy and phenylthio groups and such groups substituted by halogen, alkyl or alkoxy; acylamino groups, preferably not further substituted or halogenated alkanoylamino, alkoxycarbonylamino and alkylsulphonylamino groups, as well as unsubstituted benzoylamino and phenylsulphonylamino groups or such groups substituted by alkyl or halogen, and finally, also halogenotriazinylamino or halogenopyrimidylamino groups.

However, A in the meaning of a carbocyclic ring preferably contains electrophilic substituents which can be present therein either alone or together with the substituents given above. By electrophilic substituents are meant here, among others: carbonyl groups such as alkylcarbonyl or phenylcarbonyl groups which may be halogenated; then carboxylic acid ester groups such as alkoxycarbonyl, cycloakoxycarbonyl, phenylalkoxycarbonyl and phenyloxycarbonyl groups whereby these ester groups can be substituted by alkoxy and/or halogen and the rings of these ester groups can also be alkyl substituted; then phenyl, alkylphenyl or halogenophenylsulphonyl groups; and finally, as particularly suitable electrophilic substituents are halogens up to the atomic number 35, the nitro, trifluoromethyl, or the cyano group and low alkylsulphonyl groups.

Examples of such substituents in carbocyclic rings A, particularly in benzene rings are: the methyl, ethyl, isopropyl, tert.butyl and tert.amyl group; the cyclohexyl, phenyl, monomethylphenyl and dimethylphenyl, chlorophenyl, dichlorophenyl, bromophenyl, benzyl, methylbenzyl or chlorobenzyl group; the methoxy, ethoxy, 2-hydroxyethoxy, tert.butoxy, phenoxy, cresoxy, chlorophenoxy, bromophenoxy, phenylthio, methylphenylthio or chlorophenylthio group; the acetylamino, chloroacetylamino, bromacetylamino, β-chloropropionylamino, propionylamino, carbomethoxyamino, carbethoxyamino, carbobutoxyamino, methylsulphonylamino, chloromethylsulphonylamino and ethylsulphonylamino group; the phenyl-, tolyl-, chlorophenyl-, dichlorophenyl- or bromophenylsulphonylamino group, the benzoyl-, chlorobenzoyl- and methylbenzoylamino group; the 4,6-dichlorotriazinylamino or 2,4,5-trichloropyrimidylamino group, particularly however, the electrophilic substitutents such as the nitro, trifluoromethyl and cyano group, chlorine, bromine and/or fluorine; the acetyl, isopropionyl, tert.butyryl, chloroacetyl, benzoyl, methylbenzoyl, bromobenzoyl and chlorobenzoyl group; the methoxycarbonyl, ethoxycarbonyl, isopropoxycarbonyl, tert.butoxycarbonyl, phenoxycarbonyl, methylphenyloxycarbonyl, benzoyloxycarbonyl and chlorobenzyloxycarbonyl group; the methylsulphonyl, ethylsulphonyl, chloromethylsulphonyl, butylsulphonyl, phenylsulphonyl, tolysulphonyl, or chlorophenylsulphonyl group.

The ring A of the aromatic diazonium compounds of the heterocyclic series also can be unsubstituted or mono- or polysubstituted by identical or different substituents. As substituents of heterocyclic rings A are mentioned, among others: lower alkyl and hydroxyalkyl groups, unsubstituted phenyl radicals and those substituted by alkyl or halogen; also alkyl- and halogenoalkyl sulphonyl groups and the nitro group.

As examples of substituents in heterocyclic rings A are mentioned the methyl, ethyl, isopropyl and tert.butyl group, the phenyl, methylphenyl, chlorophenyl, and dichlorophenyl group, the methylsulfonyl, ethylsulfonyl and butylsulfonyl group and the nitro group.

As substituents of the carbocyclic rings which may be fused, the substituents of carbocyclic rings A already given can be used.

Diazonium compounds of the carbocyclic or heterocyclic series usable in the process described above for making dyestuffs of Formula III are derived, e.g., from the following amines: 1-amino-2-nitrobenzene, 1-amino-2-nitro-4-methylbenzene, 1-amino-2-nitro-4-methoxy-, -4-ethoxy- or -4-phenoxy-benzene, 1-amino-2-nitro-4-chlorobenzene, 1-amino-2-nitrobenzene-4-methylsulfone and 1-amino-2-nitrobenzene - 4 - ethylsulfone, 1-amino-2-nitro-4-trifluoromethylbenzene, 1-amino - 4 - nitrobenzene, 1-amino-4-nitro-2-methylbenzene, 1 - amino - 4 - nitro-2-methoxy- or 2-ethoxy- benzene, 1-amino-4-nitro-2-chloro- or -2-bromo-benzene, 1 - amino-4-nitro-2-cyanobenzene, 1-amino-4-nitro - 2,5 - dichlorobenzene, 1-amino-4-nitro-2,6-dichloro- or -2,6-dibromobenzene, 1-amino-4-nitro-3-carbethoxy- or -3-carbobutoxybenzene, 1-amino-2,4-dinitro-6-chlorobenzene, 1-amino - 2,4 - dinitro-6-fluorobenzene, 1-amino-3-nitro-4-fluorobenzene, 1-amino-2,4-, -2,5- or -3,4-dicyanobenzene, also 2-amino-5-nitrothiazole, 3 - amino - 1,2,4 - triazole, 2 - amino - 5 - methyl-1,3,4 - thiadoazole, 3-amino-benzpyrazole, 2 - amino-benzthiazole, 2-amino - 6 - methoxy-benzthiazole or 2-amino-6-methylsulfonyl-benzthiazole or 1-amino-2,4-dinitro-benzene.

The triazinyl ring of the coupling component according to the invention can contain identical or different inert monovalent substituents. Substituents which are inert under the dyeing conditions are meant by inert substituents. As substituents can be named, among others: alkyl radicals, preferably those having up to 4 carbon atoms, cycloalkyl radicals in particular those having 6 to 8 carbon atoms, unsubstituted phenyl radicals or phenyl radicals substituted by alkyl or halogen; the hydroxyl group; the mercapto group; alkoxy, alkylthio, hydroxyalkoxy, cyanoalkoxy groups; the amino group, mono- and disubstituted amino groups, the alkyl or phenyl substituents of which are either not further substituted or are further substituted by cyano, hydroxyl, alkoxy and/or halogen; cycloalkylamino groups, unsubstituted and alkyl- or halogen-substituted benzylamino groups, heterocyclic nitrogen bases and, finally, acylamino groups, preferably alkanoylamino and ureido groups.

Example of substituents of the triazinyl ring are: the methyl, ethyl, isopropyl, and tert., butyl group, the cyclohexyl, phenyl, methylphenyl, chlorophenyl, bromophenyl group, the hydroxyl and mercapto group, the methoxy, ethoxy, n- and isopropoxy, n- and iso-butoxy, benzyloxy, chlorobenzyloxy, cyclohexyloxy group, the methylthio, ethylthio, propylthio group, di - (carbethoxy) - methyl group, the amino, methylamino, ethylamino, n- and isopropylamino,
butylamino,
hydroxyethyl-amino,
hydroxypropylamino,
methoxypropylamino,
N,N-dimethylamino,
N,N-diethylamino,
N,N-dibutylamino,
N,N-dihydroxyethylamino,
N,N-dihydroxypropylamino,
N,N-dicyanoethylamino,
N-methyl-N-hydroxyethylamino,
phenylamino,
chlorophenylamino,
methylphenylamino,
methoxyphenylamino,
ethoxyphenylamino,
N-phenyl-N-methylamino,
N-phenyl-N-ethylamino,
N-bromophenyl-N-ethylamino,
N-phenyl-N-butylamino,
cyclohexylamino,
benzylamino, methylbenzylamino and chlorobenzylamino group, the piperidyl or morpholinyl group, the acetylamino and ureido group.

Coupling components of Formula IV usable according to the invention are obtained, e.g. by condensation of cyanoacetone or cyanoacetonimine,

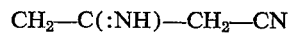

with 1-s-triazinyl - (2) - hydrazines, preferably in dilute mineral acid or in acetic acid at a raised temperature.

1 - s - triazinyl - (2) - hydrazines are compounds which are easily obtained, e.g. by reacting 4-$R_5'$-substituted and 6-$R_6'$-substituted 2-chloro-1,3,5-triazines with hydrazine.

A diazonium compound is coupled with the coupling component by the usual methods, preferably in mineral acid to weakly acid aqueous medium. Advantageously in an acid coupling medium, the mineral acid is gradually buffered, e.g. with alkali metal salts of low fatty acids, if necessary in the presence of solubility promoters, e.g. lower alkanols such as ethanol, ethylene glycol monomethyl or monoethyl ether or of amides of low fatty acids, in particular dimethyl formamide.

The following non-limitative examples serve to illustrate the invention. Where not otherwise stated, parts and percentages are given therein by weight. The temperatures are in degrees centigrade. The relationship of parts by weight to parts by volume is as that of grams to cubic centimeters.

EXAMPLE 1

23 parts of 1 - amino - 4 - ethylsulphonyl - 2 - nitrobenzene are dissolved in 120 parts of 60% sulphuric acid and the solution is diazotised for 6 hours at 20–25° with nitrosyl sulphuric acid, corresponding to 6.9 parts of sodium nitrite. The diazonium salt solution so obtained is added dropwise at 0–5° to a solution of 24.3 parts of 1 - [4′,6′ - bis - methylamino - triazinyl - (2′)] - 3-methyl - 5 - aminopyrazole in 1,200 parts of water, 150 parts of 80% acetic acid and 30 parts of 36% hydrochloric acid. After about 1 hour, the pH of the reaction mixture is raised to 4–4.5 by the addition of sodium acetate. On completion of the coupling, the red-orange precipitate is filtered off, washed neutral with dilute sodium carbonate solution and then free of salt with water. The coupling product, the composition of which corresponds to the formula

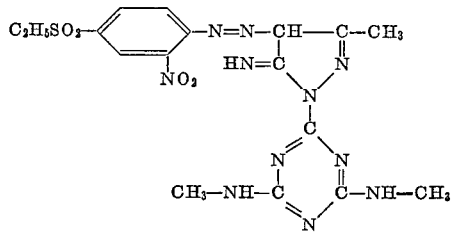

is dried in vacuo at 70–80° and then milled with a mixture of a lignin sulphonate and a naphthalene sulphonic acid-formaldehyde condensation product. The dye preparation obtained in this way dyes polyglycol terephthalate fibres, if desired with the addition of carriers such as o-phenylphenol, in vivid orange shades. The dyeings have very good fastness to washing, perspiration, light and sublimation.

The 1 - [4′,6′ - bis - methylamino - triazinyl - (2′)]-3 - methyl - 5 - aminopyrazole used in this example as starting material is obtained by reacting 2,4 - bis - methylamino-6-hydrazino-triazine with acetoacetic acid nitrile.

EXAMPLE 2

A fine suspension of 17.3 parts of 1 - amino - 2-chloro-4-nitrobenzene in 300 parts of water, 30 parts of 36% hydrochloric acid and 5 parts of cetyl polyglycol ether is diazotised at 0–5° by adding dropwise a solution of 6.9 parts of sodium nitrite in 50 parts of water. The clear diazonium salt solution is added dropwise at 0–5° to a solution of 26.2 parts of 1 - [4′,6′-bis-ethylamino-triazinyl - (2′)] - 3 - methyl - 5 - aminopyrazole in 1100 parts of water, 250 parts of 80% acetic acid and 50 parts of 36% hydrochloric acid. The free mineral acid is then buffered by the addition of sodium acetate. On completion of the coupling, the orange coloured precipitate, the composition of which corresponds to the formula

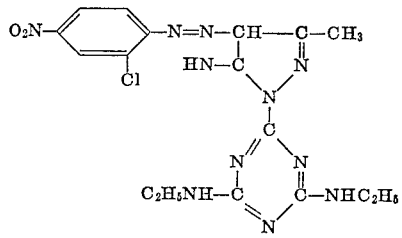

is filtered off, washed with a lot of water and dried under reduced pressure. A preparation produced by milling with a condensation product of naphthalene-2-sulfonic acid and formaldehyde dyes polyglycol terephthalate or cellulose triacetate fibers in pure yellowish orange shades from aqueous dispersion if desired in the presence of a carrier such as o-phenylphenol. The dyeings have very good fastness to rubbing, light and sublimation.

The 1-[4′,6′-bis-ethylamino-triazinyl - (2′)]-3-methyl-5-aminopyrazole used in this example as coupling component is obtained in the following manner: 80 parts of 2,4-bis-ethylamino-6-hydrazino-triazine are dissolved in 120 parts of aqueous 80%-acetic acid and 200 parts of water. Separately, 34 parts of cyano-acetone-imine, $CH_3-C(:NH)-CH_2-CN$, are added to 200 parts of aqueous 16%-hydrochloric acid. The two solutions are mixed with each other and heated during 20 hours at 30 to 40°. The formed precipitate is separated by filtration, washed with cold water, and dried in 10 torr vacuum at 70 to 80° during 18 hours. 96.5 parts of the above-mentioned desired starting material of 99% purity are obtained at a yield rate of 91%.

The pure compound of M.P. 242–244° is obtained by recrystallisation of the crude condensation product from ethyl alcohol.

Dyestuffs having similar properties are obtained if equivalent amounts of the diazo and coupling components described in the following Table I are used under the conditions described in the above example.

TABLE I

| No. | Diazo component | Coupling component | Shade on polyester fibres |
|---|---|---|---|
| 3 | 1-amino-2-nitrobenzene | 1-[4′,6′-bis-methylaminotriazinyl-(2′)]-3-methyl-5-aminopyrazole. | Reddish yellow. |
| 4 | 1-amino-2-nitro-4-methylbenzene | do | Yellowish orange. |
| 5 | 1-amino-2-nitro-4-trifluoromethylbenzene | do | Do. |
| 6 | 1-amino-2-nitrobenzene-4-sulphonic acid phenyl ester | do | Orange. |
| 7 | 1-amino-2-cyano-4-nitrobenzene | do | Do. |
| 8 | 1-amino-2-methoxy-4-nitrobenzene | do | Do. |
| 9 | 1-amino-2-nitro-4-chlorobenzene | 1-[4′,6′-bis-ethylaminotriazinyl-(2′)]-3-methyl-5-aminopyrazole. | Do. |
| 10 | 1-amino-2,4-dicyanobenzene | do | Orange. |
| 11 | 1-amino-2-nitrobenzene-4-sulphonic acid-N-methyl-N-hydroxyethylamide. | do | Do. |
| 12 | 1-amino-4-nitrobenzene | do | Yellowish orange. |
| 13 | 1-amino-4-nitro-2,6-dichlorobenzene | do | Orange. |
| 14 | 1-amino-2,4-dinitro-6-chlorobenzene | do | Reddish orange. |
| 15 | 2-amino-6-methoxybenzthiazole | do | Orange. |
| 16 | 1-amino-2-nitro-4-methoxybenzene | 1-[4′,6′-bis-propylaminotriazinyl-(2′)]-3-methyl-5-aminopyrazole. | Do. |
| 17 | 1-amino-2-nitro-4-trifluoromethylbenzene | do | Yellowish orange. |
| 18 | 1-amino-4-nitro-3-carbobutoxybenzene | do | Orange. |
| 19 | 1-amino-2-nitrobenzene-4-sulphonic acid diethylamide | do | Do. |
| 20 | 1-amino-2-nitrobenzene | 1-[4′,6′-bis-butylaminotriazinyl-(2′)]-3-methyl-5-aminopyrazole. | Reddish yellow. |
| 21 | 1-amino-2-cyano-4-nitrobenzene | do | Orange. |
| 22 | 1-amino-4-nitro-2,5-dichlorobenzene | do | Do. |
| 23 | 1-amino-2-nitro-4-chlorobenzene | do | Do. |
| 24 | 1-amino-4-nitro-2-methoxybenzene | 1-[4′,6′-bis-methoxypropylamino-triazinyl-(2′)]-3-methyl-5-aminopyrazole. | Orange. |
| 25 | 4-amino-2-methyl-5-methoxy-4′-nitroazobenzene | do | Reddish orange. |
| 26 | 2-amino-5-nitrothiazole | do | Scarlet. |
| 27 | 1-amino-4-nitro-3-carbethoxybenzene | 1-[4′,6′-bis-dimethylaminotriazinyl-(2′)]-3-methyl-5-aminopyrazole. | Orange. |

TABLE I—Continued

| No. | Diazo component | Coupling component | Shade on polyester fibres |
|---|---|---|---|
| 28 | 1-amino-4-nitro-2,6-dichlorobenzene | do | Do. |
| 29 | 1-amino-2-chloro-4-nitrobenzene | 1-[4',6'-bis-diethylaminotriazinyl-(2')]-3-methyl-5-aminopyrazole. | Do. |
| 30 | 1-amino-4-nitrobenzene | 1-[4',6'-bis-dibutylaminotriazinyl-(2')]-3-methyl-5-aminopyrazole. | Do. |
| 31 | 1-amino-2-nitrobenzene-4-sulphonic acid diethylamide | do | Do. |
| 32 | do | 1-[4'-dimethylamino-6'-methoxypropylamino-triazinyl-(2')]-3-methyl-5-aminopyrazole. | Do. |
| 33 | 2-amino-6-methylsulphonyl-benzthiazole | do | Do. |
| 34 | do | 1-[4'-ethylamino-6'-dibutylamino-triazinyl-(2')]-3-methyl-5-aminopyrazole. | Do. |
| 35 | 1-amino-2-nitrobenzene | 1-[4'-phenylamino-6'-methylamino-triazinyl-(2')]-3-methyl-5-aminopyrazole. | Reddish yellow. |
| 36 | 1-amino-2-chloro-4-nitrobenzene | 1-[4'-(2''-methylphenyl)amino-6'-diethylamino-triazinyl-(2')]-3-methyl-5-aminopyrazole. | Yellowish orange. |
| 37 | do | 1-[4',6'-bis-N-methyl-N-hydroxyethylamino-triazinyl-(2')]-3-methyl-5-aminopyrazole. | Do. |
| 38 | 1-amino-2-cyano-4-nitrobenzene | do | Orange. |
| 39 | do | 1-[4',6'-bis-hydroxyethylamino-triazinyl-(2')]-3-methyl-5-aminopyrazole. | Do. |
| 40 | 2-amino-5-nitrothiazole | do | Scarlet. |
| 41 | do | 1-[4'-cyclohexylamino-6'-ethylamino-triazinyl-(2')]-3-methyl-5-aminopyrazole. | Do. |
| 42 | 1-amino-2-nitro-4-methylsulfonylbenzene | 1-[4'-benzylamino-6'-methylamino-triazinyl-(2')]-3-methyl-5-aminopyrazole. | Orange. |
| 43 | 1-amino-2-nitro-4-methylsulfonylbenzene | 1-[4'-propylamino-6'-diethylamino-triazinyl-(2')]-3-methyl-5-aminopyrazole. | Do. |
| 44 | 1-amino-2,4-dinitrobenzene | 1-[4',6'-bis-ethylaminotriazinyl-(2')]-3-methyl-5-aminopyrazole. | Do. |
| 45 | do | 1-[4',6'-bis-diethylaminotriazinyl-(2')]-3-methyl-5-aminopyrazole. | Do. |
| 46 | do | 1-[4',6'-bis-butylaminotriazinyl-(2')]-3-methyl-5-amino pyrazole. | Do. |

EXAMPLE 47

16.3 parts of 1-amino-2-cyano-4-nitrobenzene are added to 200 parts of a mixture of concentrated sulphuric acid and nitrosyl sulphuric acid, corresponding to 6.9 parts of sodium nitrite, at 0–5°. To complete the diazotisation, the reaction mixture is stirred overnight at 10–15°. The diazonium salt solution so obtained is poured onto about 1,200 parts of finely crushed ice, clarified, and added dropwise to a solution of 26.4 parts of 1-[4',6'-bis-ethoxy-triazinyl-(2')]-3-methyl-5-aminopyrazole in 1,200 parts of water and 75 parts of 36% hydrochloric acid. The free mineral acid is then buffered by the addition of sodium acetate. On completion of the coupling, the precipitated scarlet precipitate is filtered off, washed in the usual way with dilute sodium carbonate solution and then with water, and dried. The composition of the dyestuffs obtained corresponds to the formula

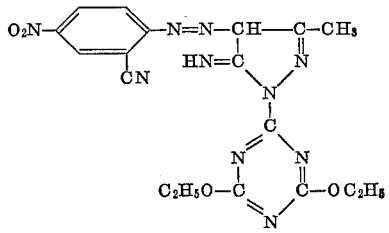

After milling with a condensation product of naphthalene-2-sulphonic acid and formaldehyde, polyglycol terephthalate fibres can be dyed with dyestuff described in pure orange shades from an aqueous dispersion, if desired in the presence of a carrier such as o-phenylphenol. The dyebath is substantially exhausted. The dyeings have very good fastness to light and sublimation.

The 1-[4',6'-bis-ethoxy-triazinyl-(2')]-3-methyl-5-amino-pyrazole used in the example described in starting material is obtained by condensing 2,4-bis-ethoxy-6-hydrazino-triazine with acetoactic acid nitrile. The compound, recrystallised from methanol, melts at 212–214°.

Dyestuffs having similar properties are obtained if equivalent amounts of the diazo and coupling components given in the following Table II are coupled under the conditions described in Example 47.

TABLE II

| No. | Diazo component | Coupling component | Shade on Polyester fibres |
|---|---|---|---|
| 48 | 1-amino-2-chloro-4-nitrobenzene | 1-[4',6'-bis-methoxytriazinyl-(2')]-3-methyl-5-aminopyrazole | Yellowish orange. |
| 49 | 1-amino-2-ethoxy-4-nitrobenzene | do | Orange. |
| 50 | 1-amino-2,4-dinitrobenzene | do | Do. |
| 51 | 1-amino-2,4-dinitro-6-chlorobenzene | do | Do. |
| 52 | 1-amino-2-nitro-4-chlorobenzene | 1-[4',6'-bis-ethoxytriazinyl-(2')]-3-methyl-5-aminopyrazole | Do. |
| 53 | 1-amino-2-nitro-4-phenoxybenzene | do | Do. |
| 54 | 1-amino-4-nitro-3-carbobutoxybenzene | do | Do. |
| 55 | 1-amino-4-nitro-2,6-dichlorobenzene | do | Orange. |
| 56 | 1-amino-2-nitro-4-trifluoromethylbenzene | do | Yellowish orange. |
| 57 | 1-amino-2-nitrobenzene-4-sulphonic acid-o-tolyl ester | do | Orange. |
| 58 | 2-aminobenzthiazole | do | Reddish yellow. |
| 59 | 1-amino-3-nitro-4-fluorobenzene | do | Orange. |
| 60 | 1-amino-2-nitrobenzene-4-sulphonic acid-N-methyl-N-hydroxyethylamide. | 1-[4',6'-bis-propoxytriazinyl-(2')]-3-methyl-5-aminopyrazole | Do. |
| 61 | 1-amino-2-nitrobenzene-4-methylsulphone | 1-[4',6'-bis-butoxy-triazinyl(2')]-3-methyl-5-aminopyrazole | Orange. |
| 62 | 1-amino-2-cyano-4-nitrobenzene | do | Do. |
| 63 | 1-amino-2,4-dinitrobenzene | do | Do. |
| 64 | 1-amino-2,5-dichloro-4-nitrobenzene | do | Do. |
| 65 | 2-amino-5-nitrothiazole | do | Scarlet. |
| 66 | 1-amino-2-nitrobenzene-4-sulphonic acid amide | 1-[4',6'-bis-piperidinotriazinyl-(2')]-3-methyl-5-aminopyrazole | Do. |
| 67 | 1-amino-2,4-dinitro-6-chlorobenzene | do | Do. |
| 68 | do | 1-[4',6'-bis-morpholinotriazinyl-(2')]-3-methyl-5-aminopyrazole | Do. |

TABLE II—Continued

| No. | Diazo component | Coupling component | Shade on Polyester fibres |
|---|---|---|---|
| 69 | 1-amino-2,4-dinitrobenzene | 1-[4'-ethoxy-6'-diethylamino-triazinyl-(2')]-3-methyl-5-amino-pyrazole. | Orange. |
| 70 | 2-amino-5-nitrothiazole | 1-[4'-methoxy-6'-phenylamino-triazinyl-(2')]-3-methyl-5-aminopyrazole. | Scarlet. |
| 71 | 1-amino-2-chloro-4-nitrobenzene | 1-[4'-butoxy-6'-ethylamino-triazinyl-(2')]-3-methyl-5- amino-pyrazole. | Yellowish orange. |
| 72 | 1-amino-2-nitro-4-ethoxybenzene | do | Do. |
| 73 | 1-amino-2-nitro-4-ethylsulfonylbenzene | 1-[4',6'-bis-ethylaminotriazinyl-(2')]-3-methyl-5-amino-pyrazole. | Yellowish orange. |
| 74 | 1-amino-2-nitrobenzene | 1-[4',6'-bis(β-methoxypropyl-amino)-triazinyl-(2')]-3-methyl-5-aminopyrazole. | Reddish yellow. |
| 75 | do | 1-[4',6'-bis-(β-cyanoethylamino)-triazinyl-(2')]-3-methyl-5-amino-pyrazole. | Do. |
| 76 | 1-amino-nitro-4-methyl-benzene | 1-[4',6'-bis-(N,N-di-β-hydroxyethyl-amino)-triazinyl-(2')]-3-methyl-5-amino-pyrazole. | Yellowish orange. |
| 77 | do | 1-[4',6'-bis-(N-methyl-N-γ-methyloxypropyl-amino)-triazinyl-(2')]-3-methyl-5-amino-pyrazole. | Do. |
| 78 | 1-amino-2-nitro-4-chloro-benzene | 1-[4',6'-bis-(β-chloroethoxy)-triazinyl-(2')]-3-methyl-5-amino-pyrazole. | Yellowish orange. |
| 79 | do | 1-[4',6'-bis-(β-cyanoethoxy)-triazinyl-(2')]-3-methyl-5-amino-pyrazole. | Do. |
| 80 | 1-amino-2-chloro-4-nitrobenzene | 1-[4',6'-bis-(β-methoxyethoxy)-triazinyl-(2')]-3-methyl-5-amino-pyrazole. | Do. |
| 81 | do | 1-[4',6'-bis-methylthiotriazinyl-(2')]-3-methyl-5-amino-pyrazole. | Do. |
| 82 | 1-amino-2-bromo-4-nitro-benzene | 1-[4'-N,N-diethylamino-6'-mercapto-triazinyl-(2')]-3-methyl-5-amino-pyrazole. | Do. |
| 83 | 1-amino-2-bromo-4-nitro-benzene | 1-[4'-propylamino-6'-hydroxy-triazinyl-(2')]-3-methyl-5-amino-pyrazole. | Do. |
| 84 | 1-amino-2-cyano-4-nitro-benzene | 1-[4'-ethylamino-6'-(4''-chlorophenylamino)-triazinyl-(2')]-3-methyl-5-aminopyrazole. | Orange. |
| 85 | do | 1-[4'-N,N-dimethylamino-6'-(2''-methoxyphenylamino)-triazinyl-(2')]-3-methyl-5-aminopyrazole. | Do. |
| 86 | 1-amino-2-nitro-4-methylsulfonylbenzene | 1-[4'-methylamino-6'-(4''-chlorobenzylamino)-triazinyl-(2')]-3-methyl-5-amino-pyrazole. | Yellowish orange. |
| 87 | do | 1-[4'-ethoxy-6'-(N-phenyl-N-methyl-amino)-triazinyl-(2')]-3-methyl-5-amino-pyrazole. | Do. |
| 88 | 1-amino-2-chloro-4-nitro-benzene | 1-[4',6'-bis-aminotriazinyl-(2')]-3-methyl-5-amino-pyrazole. | Do. |

EXAMPLE 89

14.5 parts of 2-amino-5-nitrothiazole are added in portions at 0–5° to a mixture of 85 parts of glacial acetic acid, 15 parts of propionic acid and nitrosyl sulphuric acid, corresponding to 6.9 parts of sodium nitrate. The reaction mixture is then diluted with 85 parts of glacial acetic acid and 15 parts of propionic acid and stirred for 3 hours at 0–5°.

For the coupling, 31.8 parts of 1-[4',6'-bis-diethyl-aminotriazinyl - (2')]-3-methyl-5-aminopyrazole are dissolved in 360 parts of glacial acetic acid and 60 parts of propionic acid and the clear diazonium salt solution is added dropwise at 5°. The free sulphuric acid is buffered by the addition of anhydrous sodium acetate. On completion of the coupling, the reaction mixture is diluted with water and the dyestuff which precipitates, the composition of which corresponds to the formula

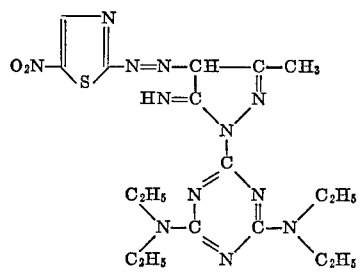

is filtered off, washed with a great deal of water and dried in vacuo at 60–70°. A preparation produced by milling with a condensation product of naphthalene-2-sulphonic acid and formaldehyde, dyes polyglycol terephthalate fibres in scarlet shades from an aqueous dispersion, if desired in the presence of carriers such as o-phenylphenol. The dyeings have very good fastness to washing, rubbing, sublimation and light.

The 1-[4',6'-bis-diethylamino-triazinyl-(2')]-3-methyl-5-aminopyrazole used in the above example is produced by reacting the corresponding hydrazine with acetoacetic acid nitrile.

EXAMPLE 90

2 parts of the dyestuff obtained according to Example 1, as finely dispersed powder, are dispersed in 4,000 parts of water. 12 parts of the sodium salt of o-phenylphenol are added to this dispersion as carrier and also 12 parts of diammonium phosphate are added. 100 parts of polyglycol terephthalate yarn are dyed for 1½ hours at 95–98°. The dyeing is rinsed and after-treated with dilute sodium hydroxide solution and a dispersing agent.

An orange dyeing is obtained in this way which is fast to washing, light and sublimation.

If in the above example, 100 parts of polyglycol terephthalate yarn are replaced by 100 parts of cellulose triacetate fabric, dyeing is performed under the conditions given above and finally the dyeing is rinsed with water, then an orange dyeing is obtained which has very good fastness to washing and sublimation.

EXAMPLE 91

In a pressure dyeing apparatus, 2 parts of the dyestuff obtained according to example 2 are finely dispersed in 2,000 parts of water containing 4 parts of oleyl polyglycol ether. The pH of the dye bath is adjusted to 6–6.5 with acetic acid.

100 parts of polyglycol terephthalate fabric are introduced at 50°, the bath is heated within 30 minutes to 140° and dyeing is performed for 50 minutes at this temperature. The dyeing is then rinsed with water, soaped and dried. Under these conditions a yellowish orange dyeing is obtained which is fast to washing, perspiration, light and sublimation.

The dyestuffs described in the other examples produce dyeings of equal quality by this process.

EXAMPLE 92

Polyglycol terephthalate fabric (such as Dacron) is impregnated in a foulard at 40° with a liquor of the following composition:

20 parts of the dyestuff contained according to Example 3, finely dispersed in 7.5 parts of sodium alginate,
20 parts of triethanolamine,
20 parts of octylphenol-polyglycol ether and
900 parts of water.

The fabric is wrung out to about 100% content, dried at 100° and then the dyeing is fixed for 30 seconds at a temperature of 210°. The dyed goods are rinsed with water, soaped and dried. Under these conditions an orange dyeing is obtained which is fast to washing, rubbing, light and sublimation.

The dyestuffs described in the other examples produce dyeings of equal quality by this process.

We claim:

1. A reddish yellow to orange scarlet metal-free monoazo dyestuff free from groups dissociating acid in water and from sulfuric acid amide, carbonic acid amide and aryloxy-sulfonyl radicals, which dyestuff is of the formula

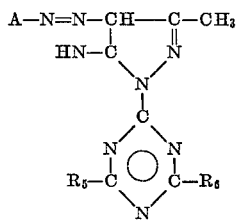

wherein A is an azo dyestuff diazo component radical selected from the group consisting of a benzene diazo component, a thiazole diazo component and a benzothiazole diazo component, $R_5$ is a member selected from the group consisting of
—$NH_2$, N-alkyl-amino, wherein "alkyl" is of 1 to 6 carbon atoms,
N-hydroxy-alkyl-amino wherein alkyl is of from 2 to 6 carbon atoms,
N-lower alkoxy-alkylamino wherein alkyl is of from 2 to 4 carbon atoms, β-cyano-ethyl amino,
N,N-di-alkyl-amino, N,N-bis-(hydroxy-alkyl) - amino wherein each each alkyl is of from 2 to 3 carbon atoms,
N-alkyl-N-hydroxy-alkyl-amino wherein "hydroxy alkyl" is of from 2 to 3 carbon atoms,
N-alkyl-N-alkoxy-alkyl-amino wherein the last-mentioned alkyl is of from 2 to 3 carbon atoms,
piperidinyl-(1), morpholinyl-(1),
alkoxy of from 1 to 6 carbon atoms,
chloro- and bromo-alkoxy, alkoxy-alkoxy and cyano-alkoxy the last four members having from 2 to 4 carbon atoms in the alkoxy moiety linked to the triazinyl nucleus, and alkylthio of from 1 to 6 carbon atoms, and $R_6$ is a member selected from the group consisting of a radical as defined above under $R_5$, hydroxy, mercapto, phenylamino, chlorophenylamino, bromophenylamino, lower alkylphenylamino, lower alkoxy-phenylamino, cyclohexylamino, benzylamino, chlorobenzylamino, lower alkyl-benzylamino and N-lower alkyl-N-phenylamino.

2. A dyestuff of the formula

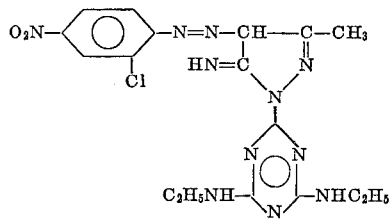

3. A dyestuff of the formula

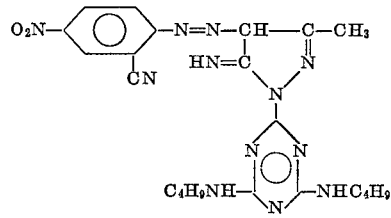

4. A dyestuff of the formula

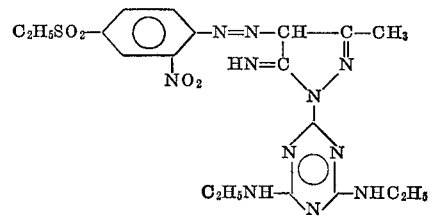

References Cited

UNITED STATES PATENTS 3,320,232   5/1967   Wegmuller et al. _____ 260—153

CHARLES B. PARKER, Primary Examiner

D. M. PAPUGA, Assistant Examiner

U.S. Cl. X.R.

8—41, 54.2, 55; 260—249.5, 249.6